(12) United States Patent
Patureau et al.

(10) Patent No.: US 8,485,563 B2
(45) Date of Patent: Jul. 16, 2013

(54) SEALED TUBULAR CONNECTION USED IN THE OIL INDUSTRY

(75) Inventors: Claire Patureau, Hesingue (FR); Olivier Tartar, Paris (FR)

(73) Assignees: Vallourec Mannesmann Oil & Gas France, Aulnoye-Aymeries (FR); Sumitomo Metal Industries, Ltd., Osaka-shi (JP)

( * ) Notice: Subject to any disclaimer, the term of this patent is extended or adjusted under 35 U.S.C. 154(b) by 149 days.

(21) Appl. No.: 13/142,493

(22) PCT Filed: Dec. 28, 2009

(86) PCT No.: PCT/EP2009/009283
§ 371 (c)(1),
(2), (4) Date: Jun. 28, 2011

(87) PCT Pub. No.: WO2010/076007
PCT Pub. Date: Jul. 8, 2010

(65) Prior Publication Data
US 2011/0266794 A1 Nov. 3, 2011

(30) Foreign Application Priority Data

Dec. 29, 2008 (FR) .................................... 08 07478

(51) Int. Cl.
*F16L 25/00* (2006.01)
(52) U.S. Cl.
USPC ....................................................... 285/333
(58) Field of Classification Search
USPC ................................. 285/333, 334
See application file for complete search history.

(56) References Cited

U.S. PATENT DOCUMENTS

| 2,992,019 | A | | 7/1961 | Macarthur | |
|---|---|---|---|---|---|
| 4,770,444 | A | * | 9/1988 | Hauk | 285/333 |
| 6,626,471 | B2 | * | 9/2003 | Mallis | 285/334 |
| 7,506,900 | B2 | * | 3/2009 | Carcagno et al. | 285/333 |
| 7,585,002 | B2 | * | 9/2009 | Curley et al. | 285/333 |
| 7,699,361 | B2 | * | 4/2010 | Verger et al. | 285/333 |
| 8,146,960 | B2 | * | 4/2012 | Dubedout et al. | 285/334 |

(Continued)

FOREIGN PATENT DOCUMENTS

| EP | 1 179 700 | 2/2002 |
|---|---|---|
| FR | 2 913 746 | 9/2008 |

OTHER PUBLICATIONS

International Search Report issued May 7, 2010 in PCT/EP09/09283 filed Dec. 28, 2009.

*Primary Examiner* — David E Bochna
(74) *Attorney, Agent, or Firm* — Oblon, Spivak, McClelland, Maier & Neustadt, L.L.P.

(57) ABSTRACT

A sealed threaded connection with a male end and a female end, the male end having a sealing surface and finishing in a terminal surface orientated transversely to the axis of the connection. The female end has a threaded zones inclined in accordance with a conical generatrix forming an angle of taper alpha; with the axis of the connection, sealing surface being cooperating with the sealing surface of the male end along a radially interfering contact zone, and finishing in a terminal surface which is transversely orientated, the tangent at the contact zone of the sealing surface being inclined along a line forming an angle beta; with the axis of the threaded connection, wherein the inclination defined by the conical generatrix relative to the threaded zones is in a direction opposite to the inclination defined by the tangent at the contact zone of the sealing surface.

12 Claims, 3 Drawing Sheets

U.S. PATENT DOCUMENTS

| | | | |
|---|---|---|---|
| 8,287,008 B2 * | 10/2012 | Charvet-Quemin et al. | 285/333 |
| 2005/0236834 A1 * | 10/2005 | Curley et al. | 285/333 |
| 2007/0035130 A1 | 2/2007 | Hashem et al. | |
| 2007/0035131 A1 * | 2/2007 | Benzie | 285/333 |
| 2007/0187951 A1 * | 8/2007 | Roussie et al. | 285/333 |
| 2010/0102553 A1 | 4/2010 | Patureau et al. | |
| 2010/0301603 A1 | 12/2010 | Beigneux et al. | |
| 2011/0133448 A1 * | 6/2011 | Williams et al. | 285/333 |

* cited by examiner

SEALED TUBULAR CONNECTION USED IN THE OIL INDUSTRY

BACKGROUND OF THE INVENTION

1. Field of the Invention

The present invention relates to a sealed threaded tubular connection under static stresses such as axial tension, axial compression, bending, internal or external pressure and a combination thereof.

2. Discussion of the Background

Such sealed threaded tubular connections, hereinafter also termed connections, may be produced by connecting a male element at the end of a first tubular component which may, for example, be a great length tube, and a female element at the end of a second tubular component which may, for example, be a great length tube or a coupling, each of said elements being provided with a metal sealing surface and being radially tightened against the metal sealing surface of the other element.

Such connections are used in particular to produce sealed casing strings or tubing strings for hydrocarbon wells or for similar wells such as geothermal wells, for example.

The metal (or metal-metal) sealing surfaces of the male and female elements of such connections are extremely critical zones which guarantee the tightness of the connection.

In hydrocarbon wells, such connections are subjected to various stresses such as tension, compression, bending and pressure which is either generated by the external environment, or generated by fluids moving inside the connections. Such diverse stresses may vary with time during, for example, the step for cementing casings (increase in external pressure) or during the production step (increase in internal pressure) or during maintenance operations (stop then restart of production) and act alone or in combination.

Such connections are not only expected to withstand such mechanical stresses, but also to remain sealed upon application thereof. For this reason, a large number of developments have been made in particular as regards connections employing metal/metal sealing surfaces. The general concept of such connections is to have two surfaces cooperating by tightening contact, one belonging to the male end of a first tubular component and the other to a female end of a second tubular component. The male and female ends each comprise a threaded zone enabling them to be connected by make up. Further, the sealing surfaces are dimensioned so that they can come into interference contact during make up, the interference contact resulting from radian tightening between the two sealing surfaces.

By way of example, document FR-2 913 746 proposes a threaded connection comprising a first and a second tubular component, each being provided with a respective male and female end, the male end comprising, on its outer peripheral surface, a threaded zone, a sealing surface and finishing in a terminal surface which is radially orientated with respect to the axis of the connection, the female end comprising, on its inner peripheral surface, a threaded zone cooperating by make up with the threaded zone of the male end, a sealing surface cooperating by tightening with the sealing surface of the male end and finishing in a terminal surface which is radially orientated with respect to the axis of the connection. The sealing surface of the female end is disposed on the inner peripheral surface of said end in a manner which is adjacent to the terminal surface. Between this sealing surface and the threaded zone, a zone is provided which has a reduced radial stiffness so that it can be deformed radially by a pressure which is exerted thereon. This reduced radial stiffness zone is obtained by reducing the annular section of the connection over a portion which is located between the threaded zone and the sealing surface of the female end. The reduction in the annular section is actually obtained by hollowing out a groove at the inner periphery. For this reason, this portion is capable of deforming radially when an external pressure is applied and for this reason generates extra elastic energy which enables the first and second sealing surfaces to be pressed together into tightening contact. It should also be noted that the zones which are thinner because of the presence of a groove recessed into the inner periphery of the female end may be considered to constitute an improvement in the case in which the threaded zone is of the "self-locking" type. In fact, that type of threading requires machining of a groove termed a "run in" groove the thickness of which is preferably at least equal to the height of the teeth to be machined and the length of which is preferably equal to at least half the lead. The "run in" groove acts to allow engagement and disengagement of cutting tools during machining of the threaded zone.

Thinning a portion of an annular section must be optimized in order to withstand pressure stresses and to provide the thinned portion with a sufficient elastic deformation range. This compromise, however, has limitations when the pressure exceeds the maximum elastic deformation threshold which is admissible by the groove. This may occur in the case in which the sealing surface is external, when the connection passes through pockets of fluids located at large depths. Similarly, when the sealing surface is internal, the value of the maximum pressure admissible by the groove may be exceeded when the fluid starts to move again at full speed after an interruption.

SUMMARY OF THE INVENTION

In order to overcome the problem of collapse of the thinned portion under external pressure or burst in the case of an internal pressure, the invention proposes modifying the inclination of the sealing zones, which inclination is normally in the same direction as that of the threaded zones. More particularly, the invention proposes reversing the orientation of the inclination of the sealing zones so that this new orientation opposes collapse of the thinned portion.

In general, the invention proposes securing the contact stability of the sealing zones positioned close to the terminal surface of the ends of tubular components.

More precisely, the invention provides a sealed threaded connection comprising a first and a second tubular component, each being provided with a respective male and female end, the male end comprising, on its outer peripheral surface, at least one threaded zone, at least one sealing surface and finishing in a terminal surface which is orientated transversely with respect to the axis of the connection, the female end comprising, on its inner peripheral surface, at least one threaded zone cooperating by make up with the threaded zone of the male end, the threaded zones being inclined in accordance with a tapered generatrix forming an angle of taper $\alpha$ with the axis of the connection, at least one sealing surface positioned so as to cooperate with the at least one sealing surface of the male end along a radially interfering contact zone, and finishing in a terminal surface which is transversely orientated with respect to the axis of the connection, the tangent at the contact zone of said at least one sealing surface being inclined in a straight line forming an angle $\beta$ with the axis of the threaded connection, characterized in that the inclination defined by the tapered generatrix relative to the threaded zones is in a direction opposite to the inclination defined by the tangent at the contact zone of said at least one sealing surface.

Optional characteristics of the invention, which are complementary or substitutive, are given below.

The tangent at the contact zone of said at least one sealing surface forms an angle β in the range 1 to 30 degrees in absolute value.

The at least one sealing surface of the male end is disposed on the outer peripheral surface of said male end close to the terminal surface of said male end, the sealing surface of the female end being disposed facing the sealing surface of the male end.

The at least one sealing surface of the female end is disposed on the inner peripheral surface of said female end close to the terminal surface of said female end, the sealing surface of the male end being disposed facing the sealing surface of the female end.

The sealing surfaces are tapered surfaces defining a tapered generatrix making an angle β with the axis of the connection.

The sealing surfaces are toric surfaces with radius R the tangent to which at the contact zone forms an angle β with the axis of the connection.

One of the sealing surfaces is a tapered surface; the other corresponding facing sealing surface being toric with a radius R and the tangent at the contact zone between the tapered surface and the toric surface forming an angle β with the axis of the connection.

The radius of the toroid R is in the range 30 to 100 mm.

A chamfer adjacent to the terminal surface is provided on the peripheral surface opposite to that which includes the sealing surface.

The chamfer is inclined at an angle γ with respect to the axis of the connection which is in the range 1 to 30 degrees.

The chamfer forms an angle γ with the axis of the connection which is substantially equal to the angle formed by the tangent at the contact zone between the sealing surfaces with the axis of the connection.

The threaded zones cooperate with self-locking tightening.

The threaded zones are respectively constituted by a first and second threaded zone, the first and second threaded zones being stepped with respect to each other.

BRIEF DESCRIPTION OF THE DRAWINGS

The characteristics and advantages of the invention will be described in more detail below with reference to the accompanying drawings.

DETAILED DESCRIPTION OF THE PREFERRED EMBODIMENTS

Figure 1:
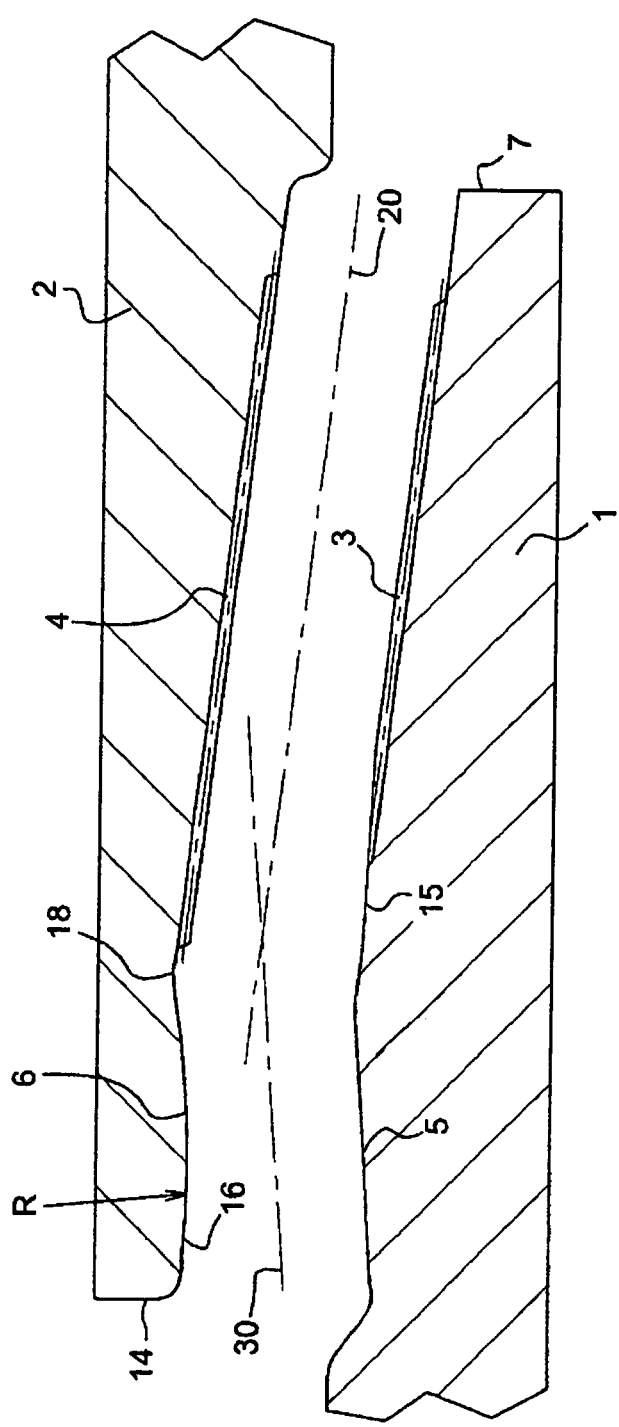
FIG. 1 is a diagrammatic view of a connection in which a sealing surface is provided close to the terminal surface of the female end in accordance with a first embodiment of the invention.
Figure 1:
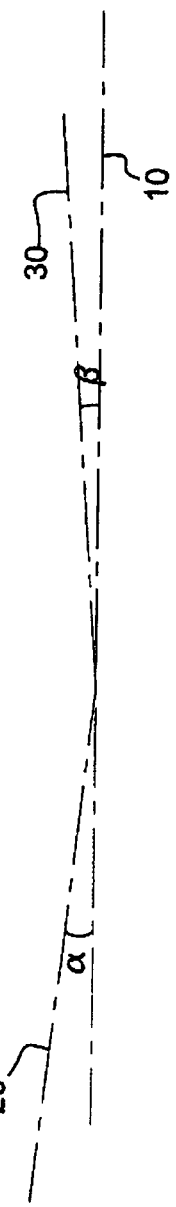

The threaded tubular connection shown in FIG. 1 is a sealed threaded connection comprising a first and a second tubular component, each being provided with a respective male 1 and female 2 end. The male end 1 and the female end 2 each finish in a terminal surface, respectively 7 and 14, orientated transversely with respect to the axis of the connection 10. The term "orientated transversely with respect to the axis of the connection" means that the respective terminal surfaces 7 and 14 are not parallel to the axis of the connection but belong to a plane which intersects with the axis of the connection, forming an angle with the normal to the axis of the connection which is less than 45 degrees. These terminal surfaces may be axial abutment surfaces which are intended to cooperate by abutment with corresponding surfaces in order to withstand make up torques during make up of the male end into the female end.

The male end 1 comprises, on its outer peripheral surface, a threaded zone 3; similarly, the female end 2 comprises, on its inner peripheral surface, a threaded zone 4, the respective zones 3, 4 cooperating during mutual connection of the two ends 1 and 2 by make up. The threaded zones 3 and 4 define a tapered generatrix 20 forming an angle α with the axis 10 of the threaded connection such that, taking the axis 10 of the connection 1 as a reference and using a reverse trigonometric orientation, the angle α is zero or greater. This angle is conventionally in the range 1 to 45 degrees.

The tightness to fluid both to the inside of the tubular connection and to the medium outside the tubular connection is provided by two metal/metal sealing surfaces 5, 6 located close to the terminal surface 14 of the female end 2. More precisely, the sealing surface 6 is disposed on the inner peripheral surface of the female end 2 close to the terminal surface 14, itself orientated along a line which is substantially perpendicular to the axis 10 of the connection. Facing the sealing surface 6 is the sealing surface 5 provided on the outer peripheral surface of the male end 1. The two sealing surfaces are positioned so as to be brought into interference contact when the male end is made up into the female end. The term "interference contact" means that the external diameter of the male end 1 at the sealing surface 5 is slightly greater than the internal diameter of the female end 2 at the sealing surface 6. In the embodiment described in FIG. 1, the sealing surface 6 is a toric surface with a radius R. Either side of the toric surface, the inner periphery of the female end carries tapered surfaces. Between the toric surface 6 and the threaded zone 4 is a thinned tapered portion 18. Actually, this thinned portion 18 is produced by hollowing a groove in the inner periphery of the female end 2 at the end of the threaded zone 4 in order to readily engage and disengage tools during machining of the threading. For this reason, this thinned portion has a reduced radial stiffness which renders the connection vulnerable in this region when the external pressure increases until it exceeds the threshold admissible by the thinned portion. The terminal surface 14 of the female end 2 and the toric surface 6 are connected by means of a tapered surface 16 provided in the inner periphery of the female end and adjacent to said terminal surface 14. The tapered surface 16 adjacent to the terminal surface 14 forms therewith an angle close to 90° and has an inclination which is in the same direction as the threaded zones 3 and 4. It should be noted that the various surfaces are conventionally connected together by means of radii in order to avoid sharp angles which are usually proscribed by machining rules.

The toric surface 6 is a convex domed toric surface the diameter of which decreases in the direction of the terminal surface 14. The radius R is preferably in the range 30 to 100 mm. Too great a radius (>100 mm) of the toric surface would introduce disadvantages identical to those of cone-on-cone contact. Too small a radius (<30 mm) of this domed surface would result in insufficient contact width.

Facing the sealing surface 6, the male end has a tapered sealing surface 5 the diameter of which also decreases in the direction of the terminal surface 14 of the female element. The tapered sealing surface 5 has a tapered generatrix making an angle β with the axis 10 of the connection. Similarly, the tangent 30 at the contact zone between the sealing surfaces 5 and 6 defines a taper making an angle β with the axis 10 of the connection. In accordance with the invention, the tangent 30 at the contact zone of the sealing surfaces and the tapered generatrix 20 relative to the threaded zones (3, 4) are inclined in opposite directions. It should also be noted that the absolute value of angles α and β is not necessarily the same.

The tapered surface 5 and the threaded zone 3 of the male end 1 are connected via another tapered surface 15 which has an inclination in the same direction as that of the threaded zone 3. This surface 15 is termed a "guide surface" because during make up of the male end into the female end, it enables to guide the female end 2 and pass over the intersection between the sealing surface 5 of the male end 1 and said guide surface 15. In fact, this intersection is convex in shape and corresponds to a change in inclination, which means that the tapered surface 16 provided on the inner periphery of the female end adjacent to the terminal surface 14 is guided by the guide surface 15 during make up so that it climbs over the intersection. Thus, the portion of the female end 2 carrying the tapered surface 16 deforms elastically during passage of the intersection such that the male end 1 and female end 2 are snap fitted into each other. At the end of make up, the sealing surfaces are positioned in radially interfering contact.

Advantageously, by taking as a reference the axis 10 of the connection 1 as well as the normal trigonometric orientation, the angle β is in the range 1 to 30 degrees. Too small a taper for the tapered surface 5 induces a risk of galling on make up and too high a taper reduces contact stability. The inventors have found that such a contact zone between a tapered surface and a domed surface enables to produce a large effective axial contact width and a substantially parabolic distribution of the contact pressures along the effective contact zone, in contrast to contact zones between two tapered surfaces which have two narrow effective contact zones at the ends of the contact zone. A contact zone geometry using the embodiment described in FIG. 1 enables to retain a good effective contact width despite variations in the axial positioning of connected elements due to machining tolerances, the effective contact zone pivoting along the dome of the domed surface, retaining a parabolic profile for the local contact pressure.

Further, the skilled person will have to establish, as a function of the dimensions of the connection 1, a minimum value for the angle β such that the inclination of the contact zone generates sufficient extra elastic energy so that the first and second sealing surfaces can be pressed together into interference contact when the external pressure P tends to flex the thinned portion 18. Similarly, the skilled person will have to establish a minimum value for the angle β such that during make up or break out, any risk of galling is eliminated.

Advantageously, in order to be able to make up and break out the male end into the female end and because the inclination of the threaded zones 3, 4 and the inclination of the sealing zones 5, 6 are reversed, the skilled person will have to adopt a maximum value for the angle β such that the deformation of the portion of the female end 2 bearing the surface 16 caused by snap fitting stays 2% short of the plastic domain of the material used.

Figure 2:
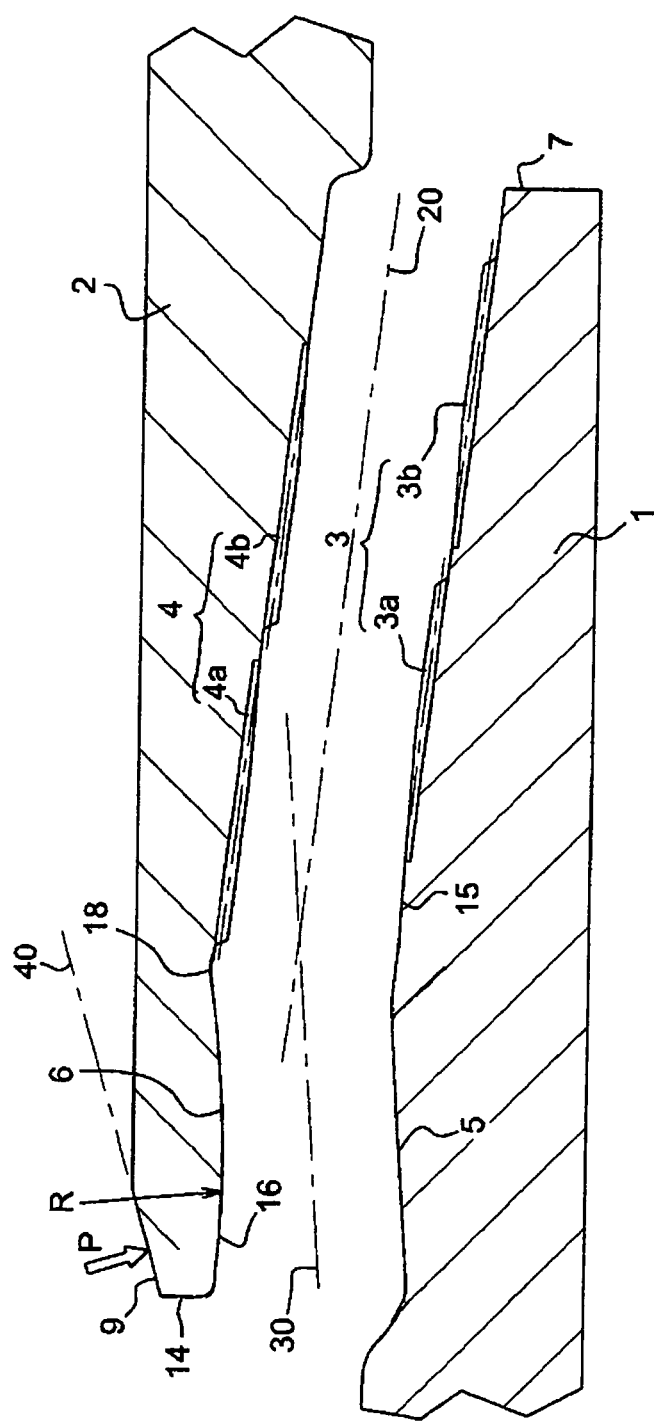
FIG. 2 is a diagrammatic view of an improvement to the connection shown in FIG. 1.
Figure 2:
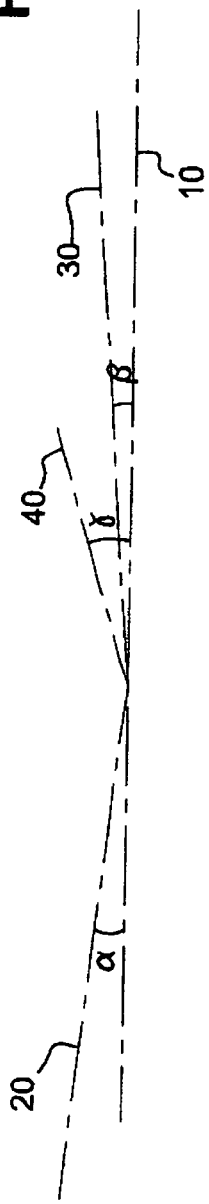

Advantageously and as described in FIG. 2, a chamfer 9 adjacent to the terminal surface 14 of the female end 2 is provided on the peripheral surface opposite to that which includes the sealing surface 6. Thus, the chamfer orientates the stresses due to the external pressure P in order to reinforce the contact between the two sealing surfaces 5 and 6.

Preferably, the chamfer 9 forms an angle γ with the axis of the connection which is substantially equal to the angle β.

Advantageously, the threaded zones 3, 4 are of a known type and termed "self-locking" (also termed gradual variation of the axial width of the threads and/or the intervals between threads and described in the prior art document U.S. Pat. No. Re 344,767) such that a progressive interference occurs during make up to a final locking position. In this case, abutment surfaces are not required.

In a variation as described in FIG. 2, the self-locking threaded zones 3, 4 each respectively comprise a first 3a, 3b and a second 4a, 4b portion, said first and second portions being stepped with respect to the other, i.e. the tapered generatrices of the first portions passing through the crests or roots of the threads are radially distant from those of the tapers of the second portions. This configuration enables to reduce the total length of the threaded zones 3 and 4 while retaining a large make up torque.

Figure 3:
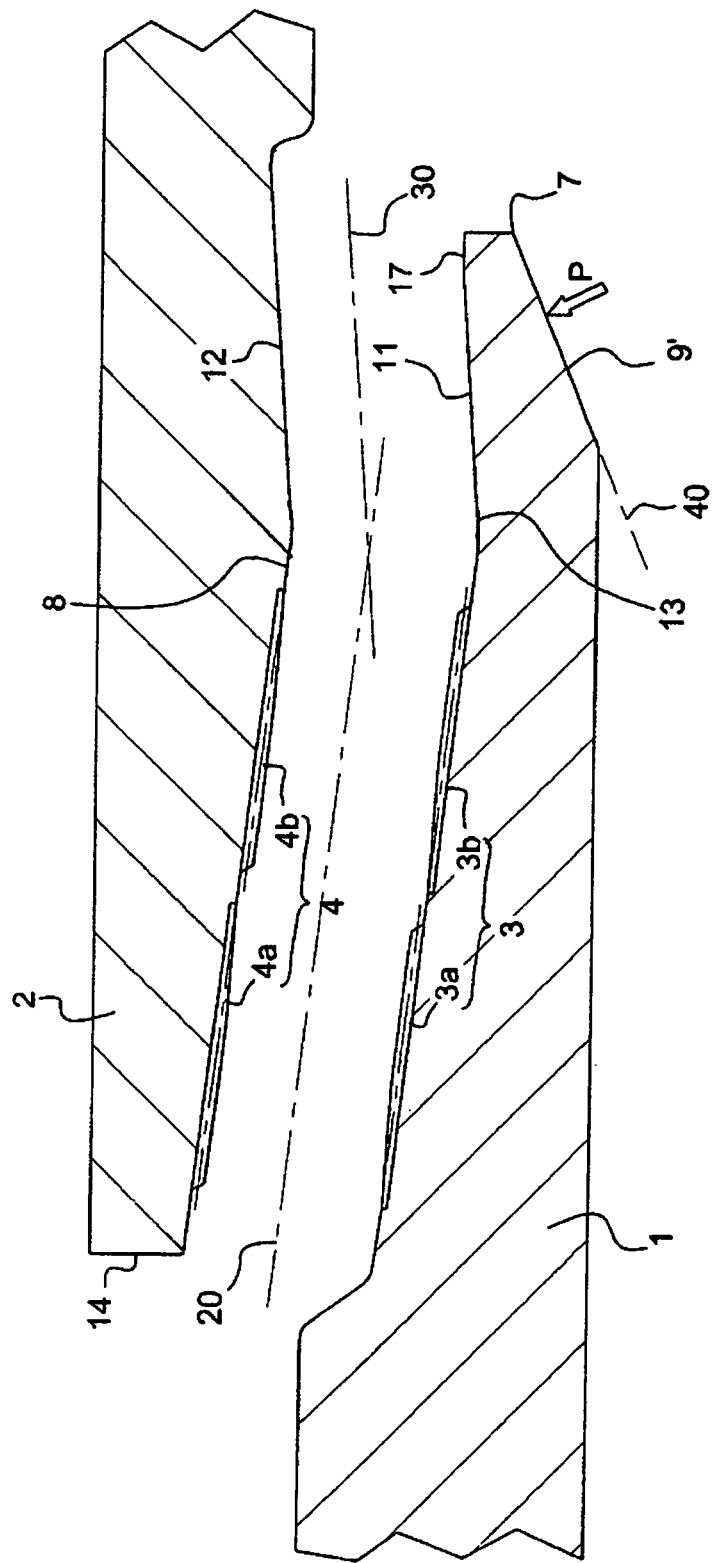
FIG. 3 is a diagrammatic view of a connection in which a sealing surface is provided close to the terminal surface of the male end in accordance with a second embodiment of the invention.

In another embodiment shown in FIG. 3, the threaded tubular connection is a sealed threaded connection comprising a first and a second tubular component, each being provided with a respective male end 1 and female end 2. The male end 1 and the female end 2 each finish in a respective terminal surface 7 and 14 which is transversely orientated with respect to the axis of the connection 10. The term "transversely orientated with respect to the axis of the connection" means that the respective terminal surfaces 7 and 14 are not parallel with the axis of the connection but belong to a plane which intersects with the axis of the connection, forming an angle with the normal to the axis of the connection of less than 45 degrees. These terminal surfaces may be axial abutment surfaces intended to cooperate in abutment with the corresponding surfaces to withstand the make up torques during make up of the male end into the female end.

The male end 1 comprises a threaded zone 3 on its outer peripheral surface; similarly, the female end 2 comprises a threaded zone 4 on its inner peripheral surface, the respective threaded zones 3, 4 cooperating together for mutual connection by make up of the two ends 1 and 2. The threaded zones 3 and 4 define a tapered generatrix 20 forming an angle α with the axis 10 of the threaded connection such that, taking as a reference the axis 10 of the connection 1 and a reverse trigonometric orientation, the angle α is zero or more. This angle is conventionally in the range 1 to 45 degrees.

Advantageously, the threaded zones 3, 4 are of known type and known as "self-locking" (also termed gradual variation of the axial width of the threads and/or the intervals between the threads), such that a progressive tightening is obtained during make up, to a final locked position. In this case, abutment surfaces are not required.

Advantageously and as described in FIG. 3, the self-locking threaded zones 3, 4 each respectively comprise a first portion 3a, 3b and a second portion 4a, 4b, said first and second portions being stepped with respect to each other. This configuration enables to reduce the total length of the threaded zones 3 and 4 while retaining a large make up torque.

The fluid seal both to the interior of the tubular connection and to the medium outside the tubular connection is provided by two metal/metal sealing surfaces 11, 12 located close to the terminal surface 7 of the male end 1. More precisely, the sealing surface 12 is disposed on the inner peripheral surface of the female end 2 close to the terminal surface 7 of the male end 1, itself orientated in a line substantially perpendicular to the axis 10 of the connection. Facing the sealing surface 6 is the sealing surface 11 provided on the outer peripheral surface of the male end 1. The two sealing surfaces are positioned so as to be in interference contact when the male end is made up into the female end. The term "interference contact" means that the external diameter of the male end 1 at the sealing surface 11 is slightly greater than the internal diameter of the female end 2 at the sealing surface 12. In the embodiment described in FIG. 3, the sealing surface 11 is a tapered surface connected to other surfaces of the inner periphery of the female end by means of radii to avoid sharp angles. Between the toric surface 11 and the threaded zone 3 is a thinned tapered portion 13. Actually, this thinned portion 13 is due to the fact that a groove has been hollowed into the outer periphery of the male end 1 at the end of the threaded zone 3 so that tools can readily be engaged or disengaged during machining of the threading. For this reason, this thinned portion has a reduced radial stiffness, which renders the connection vulnerable at this region when the internal pressure P increases to exceed the threshold admissible by the thinned portion. The terminal surface 7 of the male end 1 and the tapered surface 11 are connected by means of a tapered surface 17 provided on the outer periphery of the male end 1 and adjacent to the terminal surface 7. This connecting surface 17 forms, with the terminal surface 7, an angle close to 90° and has an inclination in the same direction as the threaded zones 3 and 4. It should be noted that the diverse surfaces are conventionally connected together by means of radii so as to avoid sharp angles, which are usually proscribed by machining rules.

The surface 11 is a tapered surface which has a tapered generatrix making an angle with the axis 10 of the connection.

Facing the sealing surface 11, the female end has a tapered sealing surface 12 which has a tapered generatrix also making an angle $\beta$ with the axis 10 of the connection. The tangent 30 to the contact zone between the sealing surfaces 11 and 12 also defines a taper with angle $\beta$ to the axis 10 of the connection. In accordance with the invention, the tangent 30 at the contact zone of the sealing surfaces and the tapered generatrix 20 relative to the threaded zones (3, 4) are inclined in opposite directions. It should also be noted that the absolute value of the angles $\alpha$ and $\beta$ is not necessarily the same.

The tapered surface 12 and the threaded zone 4 of the female end 2 are connected via another tapered surface 8 which is inclined in the same direction as the threaded zone 4. This surface 8 is termed the "guide surface" as during make up of the male end into the female end, it enables to guide the male end 1 and pass over the intersection between the sealing surface 12 of the female end 2 and said guide surface 8. In fact, this intersection is convex in shape and corresponds to a change in inclination, which means that the tapered surface 17 provided on the outer periphery of the male end adjacent to the terminal surface 7 is guided by the guide surface 8 during make up to pass over the intersection. Thus, the portion of the male end 1 bearing the tapered surface 17 is deformed elastically during passage of the intersection such that the male 1 and female 2 ends are snap fitted into one another. At the end of make up, the sealing surfaces are positioned in radially interfering contact.

Advantageously, by taking as a reference the axis 10 of the connection 1 as well as an orientation which is in accordance with the trigonometric direction, the angle $\beta$ is in the range 1 to 30 degrees. Too low a taper for the tapered surfaces 11 and 12 would run the risk of galling on make up and too high a taper would reduce the contact stability.

Further, the skilled person must establish, as a function of the dimensions of connection 1, a minimum value for the angle $\beta$ such that the inclination of the contact zone generates sufficient extra elastic energy which enables the first and second sealing surfaces to be pressed together into interference contact when the internal pressure P tends to flex the thinned portion 13. Similarly, the skilled person must establish a minimum value for the angle $\beta$ such that during make up or break out, any risk of galling is eliminated.

Advantageously, in order to be able to make up and break out the male end into the female end and because the inclination of the threaded zones 3, 4 and the inclination of the sealing zones 11, 12 are reversed, the skilled person must adopt a maximum value for the angle $\beta$ such that the deformation of the portion of the male end 1 bearing the sealing surface 17 caused by snap fitting stays 2% short of the plastic domain for the material used.

Advantageously and as described in FIG. 3, a chamfer 9' adjacent to the terminal surface 7 of the male end 1 is provided on the peripheral surface opposite to that which includes the sealing surface 11. Thus, the chamfer orientates the stresses due to the internal pressure P so as to reinforce the contact between the two sealing surfaces 11 and 12.

Preferably, the chamfer 9' forms an angle $\gamma$ with the axis of the connection which is substantially equal to the angle $\beta$.

It should be noted that the invention also encompasses the case in which the threaded zones 3, 4 are very slightly inclined (or even not inclined) in a tapered generatrix 20 forming an angle of taper $\alpha$ with the axis 10 of the connection which is close to zero (or even equal to zero). In this case, the tangent at the zone of contact of the sealing surfaces 5, 6 or 11, 12 is also inclined in a line 30 forming an angle $\beta$ with the axis 10 of the threaded connection. The angle $\beta$ is then more than zero degrees (preferably between 0 and 30 degrees), taking as the reference the axis 10 of the connection 1 as well as an orientation in accordance with the trigonometric direction. The value of the angle $\beta$ is determined as a function of the geometrical characteristics of the connection and the mechanical stresses detailed in the embodiments described above.

Clearly, the invention is applicable to different configurations in which the sealing surfaces may have complex shapes. Thus, on one of the ends the at least one sealing surface is tapered and on the other end the corresponding sealing surface is a complex surface constituted by a tapered surface (adjacent to the terminal surface) and tangential to a tonic surface (threading side).

It should also be noted that the invention is of particular application to connections in which the sealing surfaces are located on the terminal surface side of the female end. It is in this type of configuration (described in FIG. 1 and FIG. 2) that variations in pressure, in this case external, are the most difficult to counter.

Finally, it should be noted that the invention is of particular application to connections in invention in which the threaded zones are of the self-locking type. It is in this type of configuration that thinned portions are encountered because of the presence of run in grooves.

The invention claimed is:

1. A sealed threaded connection, comprising:
   a first and a second tubular component, each being provided with a respective male end and female end, the male end including, on an outer peripheral surface of the male end, at least one threaded zone, and at least one sealing surface and finishing in a terminal surface which is orientated transversely with respect to an axis of the connection, the female end including, on an inner peripheral surface of the female end, at least one threaded zone cooperating with the threaded zone of the male end by make up, the threaded zones of the male and female ends being inclined in accordance with a tapered generatrix forming an angle of taper $\alpha$ with the axis of the connection, at least one sealing surface being positioned so as to cooperate with the at least one sealing surface of the male end along a radially interfering contact zone, and finishing in a terminal surface which is transversely orientated with respect to the axis of the connection, the tangent at the contact zone of said at least one sealing surface being inclined in a straight line forming an angle β with the axis of the threaded connection, wherein the inclination defined by the tapered generatrix relative to the threaded zones is in a direction opposite to the inclination defined by the tangent at the contact zone of said at least one sealing surface.

2. A threaded connection according to claim 1, wherein the tangent at the contact zone of said at least one sealing surface forms an angle β in the range 1 to 30 degrees in absolute value.

3. A threaded connection according to claim 1, wherein the at least one sealing surface of the male end is disposed on the outer peripheral surface of said male end close to the terminal surface of said male end, the sealing surface of the female end being disposed facing the sealing surface of the male end.

4. A threaded connection according to claim 3, wherein both of said sealing surfaces are tapered surfaces defining a tapered generatrix making the angle θ with the axis.

5. A threaded connection according to claim 3, wherein the at least one sealing surfaces are toric surfaces with radius R the tangent to which at the contact zone forms the angle β with the axis of the connection.

6. A threaded connection according to claim 3, wherein one of the at least one sealing surfaces is a tapered surface, the other corresponding facing sealing surface being toric with a radius R and the tangent at the contact zone between the tapered surface and the toric surface forming the angle β with the axis of the connection.

7. A threaded connection according to claim 6, wherein the radius R is in the range 30 to 100 mm.

8. A threaded connection according to claim 1, wherein the at least one sealing surface of the female end is disposed on the inner peripheral surface of said female end close to the terminal surface of said female end, the sealing surface of the male end being disposed facing the sealing surface of the female end.

9. A threaded connection according to claim 1, wherein the male end includes a chamfer adjacent to the terminal surface on a surface opposite the at least one sealing surface.

10. A threaded connection according to claim 9, wherein the chamfer is inclined at an angle γ with respect to the axis of the connection which is in the range 1 to 30 degrees.

11. A threaded connection according to claim 1, wherein the threaded zones cooperate in self-locking tightening.

12. A threaded connection according to claim 1, wherein the threaded zones are respectively constituted by a first threaded zone and a second threaded zone, the first and second threaded zones being stepped with respect to each other.

* * * * *

UNITED STATES PATENT AND TRADEMARK OFFICE
CERTIFICATE OF CORRECTION

PATENT NO. : 8,485,563 B2  
APPLICATION NO. : 13/142493  
DATED : July 16, 2013  
INVENTOR(S) : Claire Patureau et al.

Page 1 of 1

It is certified that error appears in the above-identified patent and that said Letters Patent is hereby corrected as shown below:

In the Specification

In column 1, line 48, change "radian" to --radial--.

In column 7, line 28, after "angle" insert --$\beta$--.

In column 8, line 39, change "tonic" to --toric--.

In the Claims

In column 9, line 23, change "$\theta$" to --$\beta$--.

Signed and Sealed this  
Twenty-ninth Day of October, 2013

Teresa Stanek Rea  
*Deputy Director of the United States Patent and Trademark Office*